United States Patent Office 3,022,150
Patented Feb. 20, 1962

3,022,150
HERBICIDAL COMPOSITION AND METHOD EMPLOYING MIXTURES OF SUBSTITUTED UREAS AND TRIAZINES
Mark B. Weed, Wilmington, Del., assignor to E. I. du Pont de Nemours and Company, Wilmington, Del., a corporation of Delaware
No Drawing. Filed Feb. 23, 1960, Ser. No. 10,015
4 Claims. (Cl. 71—2.5)

This invention relates to herbicidal compositions. It is more particularly directed to compositions containing herbicidally effective amounts of:

A substituted urea selected from the group consisting of fenuron, monuron, diuron, and the same in which one methyl group is replaced with a methoxy group; and A triazine selected from the group consisting of 2-chloro-4,6-bis(ethylamino)-s-triazine, 2-chloro-4-ethylamino-6-(isopropylamino)-s-triazine, and 2-chloro-4-ethylamino-6-(3-methoxypropylamino)-s-triazine.

It is an object of this invention to provide herbicidal compositions and methods. A further object is to provide herbicidal compositions containing mixtures of herbicidally active compounds which compositions are economically more effective for the control of weeds than are the herbicidal components of the mixture when employed separately in amount sufficient to give the same degree of control. Still other objects will become apparent hereinafter.

The foregoing and other objects of the invention are attained by means of herbicidal compositions which are composed of a mixture of one of the substituted ureas together with one of the triazines as above described.

The substituted ureas which can be used are fenuron, monuron, diuron, and the same substituted ureas in which one methyl group is replaced with methoxy. Thus in addition to the compounds named there can be used 1-phenyl-3-methyl-3-methoxyurea, 1 - p - chlorophenyl-3-methyl - 3 - methoxyurea, and 1(3,4 - dichlorophenyl)-3-methyl-3-methoxyurea.

According to the invention one or more of the above is mixed with one or more of the following triazines:

2-chloro-4,6-bis(ethylamino)-s-triazine,
2-chloro-4-ethylamino-6-(isopropylamino)-s-triazine,
2-chloro-4-ethylamino-6-(3-methoxypropylamino) - s - triazine.

The novel herbicidal compositions of the present invention should contain herbicidally effective amounts of the substituted urea and of the triazine. The relative proportions of the two can be varied somewhat depending upon the particular use. Thus for industrial purposes for elimination of all weeds in an area, approximately equal amounts of the two components will ordinarily be used. Approximately equal amounts can also be used for the selective control of weeds in crops. More broadly it can be said that in the uses just mentioned and in others the substituted ureas and the triazines can be present in a ratio ranging from about 4:1 to 1:4.

The active components just mentioned can be used with various conditioning agents and adjuvants in customary manner as will be described below and should be present in an herbicidally effective amount. Ordinarily one would not use less than about 2% of the active ingredient in, say, granular compositions, while in water-dispersible powders or solutions adapted to be dispersed further compositions may contain up to 80%, 90%, or even more of the active components.

The herbicidal mixtures of the invention can be employed by mixing them with conventional pest cntrol adjuvants or modifiers to provide compositions in the form of solutions, dusts, water-dispersible powders, and aqueous dispersions or emulsions. Thus they can be employed with a carrier or diluent agent such as a finely divided solid, a solution liquid of organic origin, water, a wetting agent, a dispersing agent, an emulsifying agent, an aqueous emulsion or any suitable combination of any of these.

Pest control adjuvants or conditioning agents such as the dusts, solvents, wetting agents, dispersing agents, and emulsifying agents set out in U.S. Patent 2,426,417 can be employed in the preparation of the herbicidal compositions of the present invention. Other wetting, dispersing, and emulsifying agents such as those listed in detail in Bulletin E607 of the Bureau of Entomology and Plant Quarantine of the U.S. Department of Agriculture and such as those set out in an article by McCutcheon in "Soap and Chemical Specialties," volume 31, No. 7, pages 50–61; No. 8, pages 48–61; No. 9, pages 52–67; and No. 10, pages 48–67 (1955) can also be used.

In the preparation of sprays, the active herbicidal compounds can be separately dispersed in water or other liquid carriers. Alternatively, the herbicidal compounds can be mixed one with the other and the resulting mixture dispersed in the liquid carrier. Also another method of operation includes mixing the herbicidal compounds with finely divided carriers or dusts such as talc, pyrophyllite, natural clays, diatomaceous earth or other powdered diluents such as those set out in the aforementioned U.S. patent and dispersing the resulting mixture in water. Any compatible wetting or dispersing agent can be employed in the mixture either before or after mixture of the active ingredients with the liquid to obtain spray compositions.

Liquid compositions of the invention contain the active components either homogeneously dispersed in water or non-solvent carriers, or dissolved in a solvent. To secure homogeneous dispersions, in non-solvent liquid adjuvants, a surface-active agent of the wetting, dispersing, or emulsifying type is used. In fact, the preferred herbicidal compositions of the invention whether in liquid or in solid form contain the herbicidally active compounds homogeneously admixed with such a surface-active agent. Generally, the wetting, dispersing, or emulsifying agent will not comprise more than about 5 to 15% by weight of the composition and with the better surface-active adjuvant material, the percentage will be 5% or less. Usually, the minimum lower concentration will be 0.1%.

The herbicidal compositions are applied either as a spray, a dust, or a granule or pellet to the locus or area to be protected from weeds. Such application can be made directly upon the locus or area and the weeds thereon during the period of weed infestation in order to destroy the weeds, or alternatively, the application can be made in advance of an anticipated weed infestation to prevent such infestation. Thus, the compositions can be applied as aqueous foliar sprays but can also be applied as sprays directly to the surface of the soil. Alternatively, the drv powdered compositions can be dusted directly on the plants or on the soil. For some purposes, as in the treatment of ponds and lake bottoms, it will be convenient to use a pellet form of the compositions.

The active ingredients are, of course, applied in amount sufficient to exert the desired herbicidal action. The amount of herbicidally active compounds present in the compositions as actually applied for destroying or preventing weeds will vary widely with the herbicidal activity of the active ingredients, the purpose for which the application is being made (i.e., whether for short term or long term control), the manner of application, the particular weeds for which control is sought, and like variables. Thus if highly active ingredients are to be used for control of weed infestations that plague food crops, the compositions containing the active ingredients are normally further diluted with a liquid to form a spray composition or with a powdered solid to give a dust containing relatively low concentration of the active compounds. On the other hand, if used to sterilize soil as in the treatment of power line or railroad right-of-ways, one or more of the active ingredients may, if of relatively low order of actvity, be used in high concentration.

The compositions of the invention containing a substituted urea and a triazine as described are far better than either of the components for controlling weed populations including: wild carrot, narrow-leaved plantain, broad-leaved plantain, goldenrod, several milkweeds, little blue stem, several perennial blue grasses, dog fennel, Johnson grass.

Compositions and methods of the invention are illustrated by the following examples. The numbers following the tabulated ingredients represent parts by weight of the ingredients in the respective compositions.

EXAMPLE 1

*Water-dispersible powders*

The following powdered compositions are adapted for dispersing in water for application as a spray for the destruction and prevention of weeds. The powdered compositions are made by intimately mixing the listed ingredients using conventional mixing or blending equipment and then grinding the mixture to give a powder having an average particle size less than about 50 microns.

(A)

| | |
|---|---|
| 3-(p-chlorophenyl)-1,1-dimethylurea, monuron | 50 |
| 2-chloro-4,6-bis(ethylamino)-s-triazine | 25 |
| Sodium lauryl sulfate (wetting agent) | 1 |
| Sodium lignosulfonate (dispersing agent) | 3 |
| Fuller's earth | 21 |

This formulation, when applied in 150 gallons of water at a rate of 30 pounds per acre of active ingredient with a conventional pressure-type hand sprayer, gives excellent control of vegetation throughout the growing season.

(B)

| | |
|---|---|
| 3-(3,4-dichlorophenyl)-1,1-dimethylurea, diuron | 55 |
| 2-chloro-4,6-bis(ethylamino)-s-triazine | 30 |
| Alkylnaphthalene sodium sulfate (wetting and dispersing agent) | 2 |
| Attapulgite clay | 13 |

This formulation is extended with 150 gallons of water and applied at a rate of 20 pounds per acre of active ingredient from a truck-mounted pressure pump with a single nozzle tommy-gun sprayer. Good control of broadleaf weeds and grass weeds is obtained when this treatment is applied to an area under boundary fences.

(C)

| | |
|---|---|
| 1-phenyl-3,3-dimethylurea, fenuron | 38 |
| 2 - chloro-4-ethylamino-6-(3-methoxypropylamino)-s-triazine | 37 |
| Alkylated aryl polyether alcohol (wetting and dispersing agent) | 4 |
| Attapulgite clay | 21 |

This formulation when applied in 150 gallons of water at a rate of 20 pounds per acre of active ingredient with a bicycle-type pressure sprayer gives excellent control of quack grass, golden rod, and milkweed along fence rows.

(D)

| | |
|---|---|
| 3-(3,4-dichlorophenyl)-1-methyl-1-methoxyurea | 40 |
| 2-chloro-4-ethylamino-6-(3 - methoxypropylamino)-s-triazine | 30 |
| Sodium disulfonate of dibutyl phenylphenol (wetting and dispersing agent) | 2 |
| Fuller's earth | 28 |

This composition is extended with water to form a sprayable formulation. When sprayed on a mixed population of broadleaf and grass weeds at a rate of 20 pounds per acre of active ingredient with a pressure sprayer, excellent weed control is obtained in a warehouse storage yard.

EXAMPLE 2

*Oil-water disperpersible powders*

The following powdered compositions are adapted for use in the preparation of spray compositions using either an oil, water, or a combination of oil and water as the liquid diluent. The powders are made by mixing and grinding as in the case of the powders of Example 1.

| | |
|---|---|
| 1-p-chlorophenyl-3-methyl-3-methoxyurea | 50 |
| 2-chloro-4-ethylamino-6-(3 - methoxypropylamino)-s-triazine | 31 |
| Polyethylene oxide esters of mixed resin and fatty acids | 5 |
| Pyrophyllite | 14 |

This composition is mixed with 100 gallons of diesel oil and applied at a rate of 20 pounds per acre of active ingredient to a railroad siding infested with Bermuda grass, broomsedge, plantain, and blue grass. Good control of these weeds is realized.

EXAMPLE 3

*Water-dispersible liquid compositions*

The following compositions are in a liquid form and are adapted for addition to water to give aqueous dispersions for application as sprays. The urea herbicides are generally quite insoluble in most oils. Therefore, the liquid compositions ordinarily are not complete solutions but rather are dispersions of solid in an oil. The liquid or fluid compositions shown are prepared by thoroughly mixing and dispersing the active compounds and conditioning agent or agents in an organic liquid diluent.

| | |
|---|---|
| 1-phenyl-3-methyl-3-methoxyurea | 20 |
| 2-chloro-4,6-bis(ethylamino)-s-triazine | 30 |
| Aryl alkyl polyether alcohol (wetting and emulsifying agent) | 3 |
| Methyl cellulose, low viscosity | 1 |
| Kerosene | 46 |

This composition is extended with 250 gallons of water to form a sprayable formulation. When applied at a rate of 30 pounds per acre of active ingredient with a knapsack sprayer, excellent weed control is obtained around highway markers and "stop" signs.

EXAMPLE 4

*Granular compositions*

The following compositions are adapted for application by a means of a fertilizer spreader apparatus or similar equipment. The compositions are readily prepared by mixing the ingredients with water to form a paste. The paste is then extruded, dried, and ground to give the desired granular size. Preferably, the granules will be in the order of one thirty-second to one-quarter inch diameter.

| | |
|---|---|
| Monuron | 10 |
| 2-chloro-4,6-bis(ethylamino)-s-triazine | 5 |
| Goulac (sodium lignosulfonate dispersing agent) | 3 |
| Hydrocarbon oil | 1 |
| Dextrin (binder) | 20 |
| Fuller's earth | 61 |

The formulation is applied at a rate of 200 pounds per acre by hand. Good control of broadleaf and grass weeds in fire lanes is obtained.

EXAMPLE 5

A preferred composition of the invention particularly suited for eradication of weeds in industrial areas is as follows:

| | |
|---|---|
| Monuron | 40 |
| 2 - chloro - 4 - ethylamino - 6 - (3 - methoxypropylamino)-s-triazine | 40 |
| Sulfuric acid ester of alkyl polyglycol ether | 3 |
| Goulac (sodium lignosulfonate) | 3 |
| Disodium phosphate | 0.8 |
| Kaolin clay | 13.2 |

Ten pounds of the above formulation is mixed with 150 gallons of water and applied to one acre of vegatation to be treated. The vegetation is made up of the following species:

- Wild carrot
- Narrow-leaved plantain
- Broad-leaved plantain
- Goldenrod
- Several milkweeds
- Little blue stem
- Several perennial blue grasses
- Dog fennel
- Johnson grass Somewhat better control can be obtained under severe conditions using the composition at the rate of 20 pounds per acre instead of 10 and, of course, more or less can be used depending upon the type of conditions and the type of control desired.

Instead of using the active components just described above, the urea can be replaced by an equal weight of diuron, and the triazine can be replaced with an equal weight of 2-chloro-4,6-bis(ethylamino)-s-triazine. Similarly a composition can be made using fenuron and 2-chloro - 4 - ethylamino - 6 - (isopropylamino) - s - triazine in the weights shown in the above composition to produce similar results.

Compositions particularly well adapted for the control of weeds in growing crops, such as weeds which are found in corn, can be made with a composition as just above described containing preferably diuron or 3-(3,4-dichlorophenyl)-1-methyl-1-methoxyurea with one of the triazines: 2-chloro-4,6-bis(ethylamino)-s-triazine; 2-chloro - 4 - ethylamino - 6 - (isopropylamino) - s - triazine; or 2 - chloro - 4 - ethylamino - 6 - (3 - methoxypropylamino)-s-triazine. For this purpose these compositions can be used at the rate of, say, 1 to 2 pounds of the mixture per acre.

As a pre-emergent treatment the compositions of the invention give control of crab grass, Johnson grass, wild oats, water grass, ragweed, pigweed, cockleburr, wild mustard, and other weeds.

This application is a continuation-in-part of U.S. application Serial No. 505,520, filed May 2, 1955, now abandoned, and of my copending U.S. application Serial No. 649,304, filed March 29, 1957, now abandoned.

I claim:

1. A herbicidal composition comprising a herbicidally effective amount of a mixture of:

A substituted urea selected from the group consisting of 1 - phenyl - 3,3 - dimethylurea, 3 - (p - chlorophenyl) - 1,1 - dimethylurea, 3 - (3,4 - dichlorophenyl)-1,1-dimethylurea, and the same in which one methyl group is replaced with a methoxy group, and A triazine selected from the group consisting of 2-chloro - 4,6 - bis(ethylamino) - s - triazine, 2 - chloro - 4 - ethylamino - 6 - (isopropylamino) - s - triazine, and 2-chloro-4-ethylamino-6-(3-methoxypropylamino)-s-triazine.

2. A herbicidal composition comprising a herbicidally effective amount of a mixture of:

A substituted urea selected from the group consisting of 1-phenyl-3,3-dimethylurea, 3-(p-chlorophenyl)-1,1-dimethylurea, 3-(3,4-dichlorophenyl)-1,1-dimethylurea, and the same in which one methyl group is replaced with a methoxy group, and A triazine selected from the group consisting of 2-chloro - 4,6 - bis(ethylamino) - s - triazine, 2 - chloro - 4 - ethylamino - 6 - (isopropylamino) - s - triazine, and 2 - chloro - 4 - ethylamino - 6 - (3-methoxypropylamino)-s-triazine the ratio of substituted urea:triazine being from 4:1 to 1:4.

3. A herbicidal composition comprising a herbicidally effective amount of a mixture of:

A substituted urea selected from the group consisting of 1-phenyl-3,3-dimethylurea, 3-(p-chlorophenyl)-1,1-dimethylurea, 3-(3,4-dichlorophenyl)-1,1-dimethylurea, and the same in which one methyl group is replaced with a methoxy group, and A triazine selected from the group consisting of 2-chloro - 4,6 - bis(ethylamino) - s - triazine, 2 - chloro - 4 - ethylamino - 6 - (isopropylamino) - s - triazine, and 2 - chloro - 4 - ethylamino - 6 - ( - methoxypropylamino)-s-triazine, the substituted urea and triazine being present in about equal amounts.

4. A method for the control of weeds which comprises applying to a locus to be protected a herbicidal composition comprising a herbicidally effective amount of a mixture of:

A substituted urea selected from the group consisting of 1-phenyl-3,3-dimethylurea, 3-(p-chlorophenyl)-1,1-dimethylurea, 3-(3,4-dichlorophenyl)-1,1-dimethylurea, and the same in which one methyl group is replaced with a methoxy group, and A triazine selected from the group consisting of 2-chloro - 4,6 - bis(ethylamino) - s - triazine, 2 - chloro - 4 - ethylamino - 6 - (isopropylamino) - s - triazine, and 2 - chloro - 4 - ethylamino - 6 - (3 - methoxypropylamino-s-triazine.

References Cited in the file of this patent

UNITED STATES PATENTS

| | | |
|---|---|---|
| 2,709,648 | Ryker et al. | May 31, 1955 |
| 2,891,855 | Gysin et al. | June 23, 1959 |
| 2,960,534 | Scherer et al. | Nov. 15, 1960 |